United States Patent [19]

Schulz

[11] 4,156,646

[45] May 29, 1979

[54] REMOVAL OF PLUTONIUM AND AMERICIUM FROM ALKALINE WASTE SOLUTIONS

[75] Inventor: Wallace W. Schulz, Richland, Wash.

[73] Assignee: The United States of America as represented by the United States Department of Energy, Washington, D.C.

[21] Appl. No.: 916,179

[22] Filed: Jun. 16, 1978

[51] Int. Cl.$^2$ .................................................. C02C 5/02
[52] U.S. Cl. .................................. 210/28; 210/38 C; 252/301.1 W; 423/6; 423/12
[58] Field of Search ...................... 210/28, 38 C, 73 R; 252/301.1 W; 423/6, 12

[56] References Cited

U.S. PATENT DOCUMENTS

| | | | |
|---|---|---|---|
| 2,931,701 | 4/1960 | Faris | 423/12 |
| 2,934,403 | 4/1960 | Ader et al. | 423/12 |
| 3,183,059 | 5/1965 | Reisenauer et al. | 423/6 |
| 3,687,641 | 8/1972 | Moore | 423/6 |

OTHER PUBLICATIONS

"New Process Consolidates Radioactive Wastes", Chemical and Engineering News, vol. 54, No. 2, Jan. 12, 1976, pp. 32–33.

Primary Examiner—Charles N. Hart
Assistant Examiner—Ivars Cintins
Attorney, Agent, or Firm—Dean E. Carlson; Richard E. Constant; Ignacio Resendez

[57] ABSTRACT

High salt content, alkaline waste solutions containing plutonium and americium are contacted with a sodium titanate compound to effect removal of the plutonium and americium from the alkaline waste solution onto the sodium titanate and provide an effluent having a radiation level of less than 10 nCi per gram alpha emitters.

3 Claims, 2 Drawing Figures

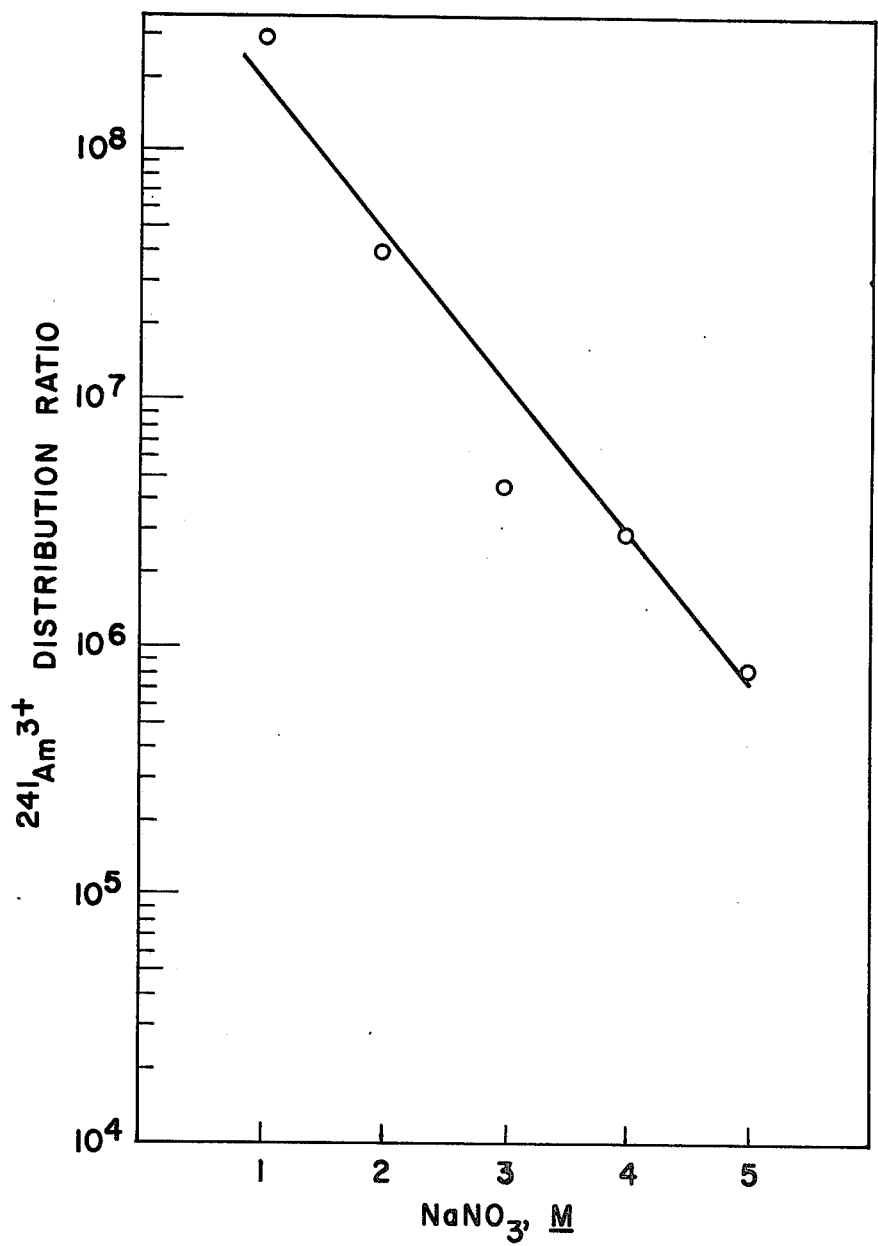
FIG. 2. DISTRIBUTION OF $Am^{3+}$ BETWEEN 1 $\underline{M}$ NaOH-NaNO$_3$ SOLUTIONS AND 40-140 MESH SODIUM TITANATE POWDER

REMOVAL OF PLUTONIUM AND AMERICIUM FROM ALKALINE WASTE SOLUTIONS

The invention described herein was made in the course of, or under, a contract with the U.S. Department of Energy.

BACKGROUND OF THE INVENTION

The invention relates to the extraction of plutonium and americium-241 from alkaline waste solutions to yield solutions containing a total of less than 10 nanocuries per gram (nCi/g) alpha radiation from plutonium and americium.

A plutonium reclamation facility (PRF) is used to receive and store all sorts of unirradiated plutonium metallurgical scrap such as alloys, metal, compounds, etc., and thereafter to process the scrap to recover and purify plutonium values. In the usual plutonium reclamation facility operation, plutonium bearing scrap or plutonium containing material is dissolved in mixtures of nitric acid and hydrofluoric acid. Aluminum nitrate is thereafter added to complex the residual fluoride and to provide salting strength and facilitate recovery of the plutonium.

The plutonium is recovered by solvent extraction with a 20% tri-n-Butyl-phosphate-carbon tetrachloride solvent. Subsequently, a 30% dibutyl-butyl-phosphonate-carbon tetrachloride solvent extraction process is used to recover most of the residual plutonium and 50 to 60% of the americium-241 from the aqueous raffinate of the tri-n-Butyl phosphate extraction scheme. The aqueous waste from the dibutyl-butyl-phosphonate process, still containing small but significant amounts of plutonium and americium-241, is diluted with large volumes of waste water to form what is termed the plutonium reclamation facility salt waste. This salt waste may be heated to from 110° C. to 120° C. to evaporate the water and dry the salts. The resultant product salt waste contains, ordinarily, from 1000 to 2000 nCi/g of alpha emitters.

The plutonium reclamation facility at Hanford, Wash. may generate in normal operation about 120 cubic meters of salt waste solution per month, which salt waste may typically contain 1.3 molar (M) sodium nitrate, 0.2 M aluminum nitrate, 0.1 M nitric acid, 0.005 to 0.02 M each of ferric ion, magnesium ion and calcium ion, 150 to 300 microcuries per liter ($\mu$Ci/l) of americium-241, and 20 $\mu$Ci/l of plutonium.

Under current Federal regulations, materials contaminated with transuranic elements in excess of 10 nCi/g cannot be disposed of in normal burial grounds and require storage in a retrievable posture, possibly for periods to 20 years. Large volumes of plutonium containing waste solutions also result from scrap recovery and other plutonium processing operations at other Government installations. These waste solutions may also contain americium-241. Commercially operated plutonium fuel fabrication and/or scrap recovery plants may also produce actinide-containing liquid wastes requiring treatment as well as storage.

Plutonium and americium have been removed from these liquid waste streams by processing these streams through multiple precipitations of iron hydroxide and, in some cases calcium phosphate, at a pH of at least 11, followed in some cases, by a subsequent treatment procedure such as reverse osmosis or passage through beds of bone char. Unless multiple iron hydroxide precipitation are used, the solution resulting from the iron hydroxide precipitation step contains concentrations of plutonium and americium in the scavenged waste solution which are still well above the maximum permissible concentrations (0.004 $\mu$Ci/l) of either americium-241 or plutonium-239 in water.

Drawbacks to using the iron hydroxide precipitation process include the necessity to filter and dry large amounts of gelatinous solids after each precipitation step, the generation of relatively large volumes of dried actinide bearing solids requiring storage as actinide wastes, and the need to eventually dispose and immobilize large volumes of dried iron hydroxide. An alternative to using multiple hydroxide precipitation steps would be to store the high salt content, aqueous waste solution from the plutonium reclamation facility having greater than 10 nCi/g of both americium and plutonium into underground tanks. The disadvantages of this disposal method is that a large amount of nonactinide fission product waste become contaminated with actinides thereby increasing the volume of wastes that need to be safely contained. While concentration and drum drying equipment may be used to convert the waste to a solid form which can be subsequently retrievably stored in 50 gallon drums or the like, this would result in a very large volume of actinide (greater than 10 nCi/g) waste requiring expensive, safe interim storage and eventual conversion to another form suitable for terminal storage. In addition, there are engineering difficulties associated with design and remote operation of a drum dryer as well as there is a need for a fine control over the aluminum to sodium ratio to get a satisfactory solid for terminal storage. Because of the above, simpler, more efficient methods for managing plutonium recovery facility waste are required which concentrate actinides to reduce the volume of alpha waste requiring long term storage.

An objective of this invention is to provide a precipitation and ion exchange procedure for reducing the actinide concentration of the waste, when solidified, to preferably below 10 nCi/g. At the present time, the salt waste solution is made alkaline and routed to underground storage tanks where it mixes with other wastes. It is an objective of this invention to avoid converting large volumes of non-actinide waste to retrievable actinide waste (greater than 10 nCi/g).

While sodium titanate has been employed to handle wastes from light-water reactor reprocessing (*Chemical and Engineering News*, "New Process Consolidates Radioactive Wastes" Vol. 54, No. 2, January 1976, pp. 32–33) this and other references do not address the problem of removing plutonium and americium from high salt content, alkaline waste solutions such as generated in the Plutonium Recovery Facilities.

SUMMARY OF THE INVENTION

It is therefore an object of this invention to provide a novel method for recovering plutonium and americium-241 from alkaline waste solutions having a high salt content.

It is a further object of this invention to recover americium and plutonium radionuclides from alkaline waste solutions having a high salt content so that the waste aqueous solution remaining has much less than 10 nCi/g of these radionuclides.

It is a further object of this invention to provide a process for removing radionuclides americium-241 and plutonium including plutonium-239 from alkaline waste solutions having a high salt content which may be used in conjunction with prior art iron hydroxide precipitation process, or in lieu thereof, to yield aqueous solutions that have less than 10 nCi/g. It is a further object of this invention to concentrate the americium-241 and plutonium radionuclides from alkaline waste solutions into a small volume. It is a further object of this invention to reduce the number of filtration and drying steps in prior art processes and yet achieve a higher concentration into a smaller volume of plutonium and americium-241 radionuclides.

These wastes are referred to as "high salt content" wastes because they contain sodium and aluminum salts at concentrations generally greater than 0.3 M.

These and other objects and advantages will become apparent from the detailed description hereinafter included, and the most novel features will be particularly pointed out hereinafter in the appended claims. It will be understood that various changes in the materials, details and steps of the process, which are herein described and illustrated to bring out the nature of the invention may be made by those skilled in the art without departing from the scope of the invention.

The invention comprises contacting a high salt content, alkaline waste solution containing americium-241 and plutonium with a sodium titanate inorganic ion exchange material to effect sorption of the radionuclides americium-241 and plutonium onto the ion exchange material from the high salt content, alkaline waste solution wherein the resultant effluent has an americium-241 and plutonium concentration of less than about 10 nCi/g.

DESCRIPTION OF DRAWING

FIG. 2 illustrates the distribution of trivalent americium between one molar sodium hydroxide - sodium nitrate solutions and titanate sorbents.

DETAILED DESCRIPTION

Figure 1:
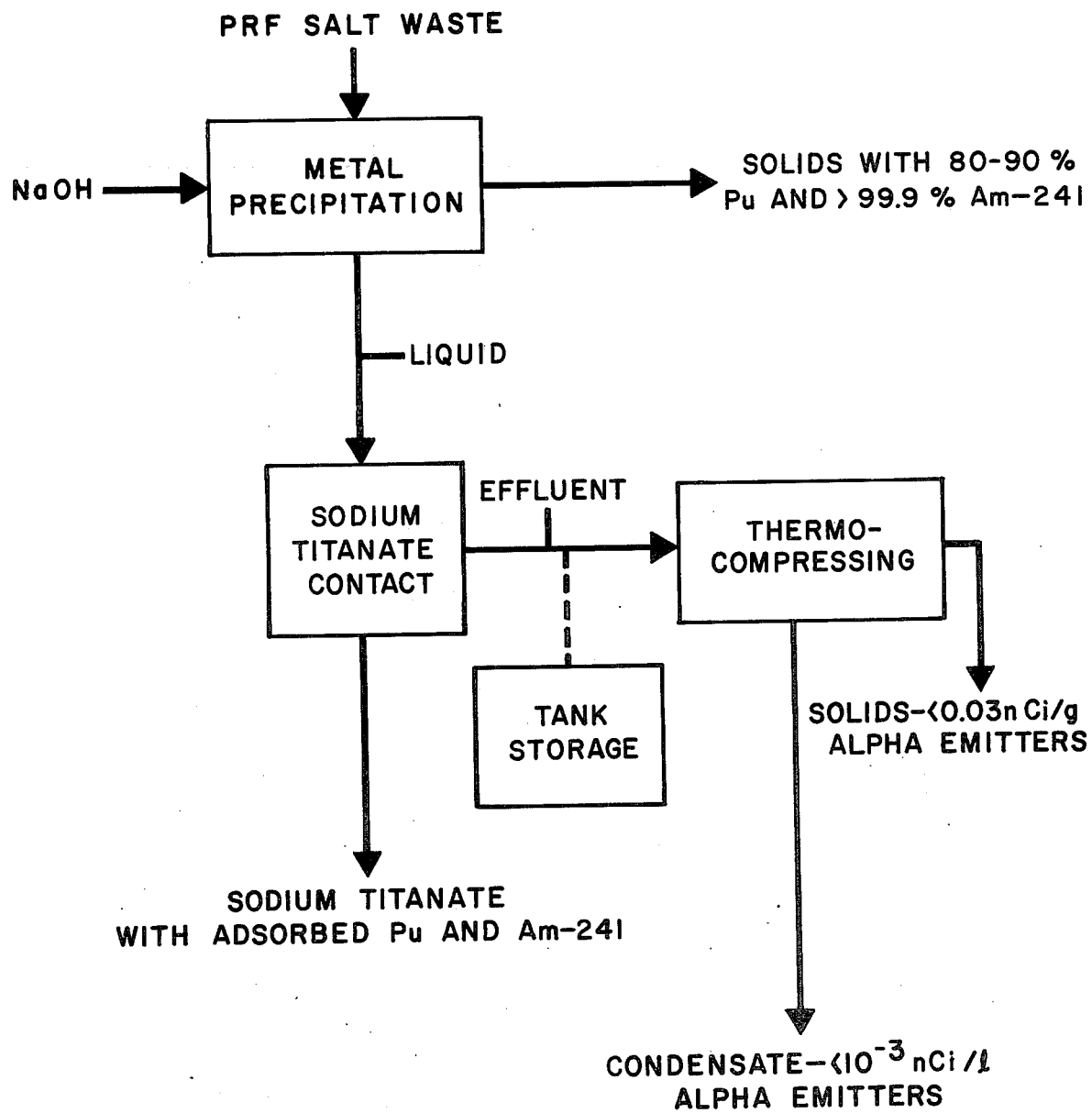
FIG. 1 illustrates a preferred flow diagram of the process.

The present invention provides a combined precipitation and ion exchange process for efficiently removing plutonium and americium from plutonium reclamation facility salt wastes. As shown in FIG. 1, the process involves the addition of sodium hydroxide to adjust the plutonium reclamation facility salt waste to 0.5-2 M hydroxide ion concentration to precipitate metal hydroxides (such as iron hydroxide, calcium hydroxide and magnesium hydroxide) and remove 80 to 90% of the plutonium and greater than 99.9% of the americium-241. The solids removed from the metal precipitation step may thereafter be concentrated such as by filtration and drying to be converted to a small volume of non-leachable borosilicicate glass or may be placed in suitable containers for retrievable storage.

The supernatant solution or liquid derived from the metal precipitation step is processed through a sodium titanate [Na(Ti$_2$O$_5$H)] powder to reduce the concentrations of both plutonium and americium-241 to below their maximum permissible concentration in water in an uncontrolled zone. The sodium titanate powder is preferably a size between 40 and 140 mesh (U.S. Standard Sieve Series). The inventor has found that sodium titanate powder has a very high affinity and capacity for sorbing both plutonium and americium from alkaline solutions. For example, sodium titanate powder of a 40-140 mesh size was used to process 3000 to 4000 column volumes of the liquid derived from the metal precipitation step and reduced the concentration of both the plutonium and the americium-241 to less than the maximum permissible concentration of each actinide in water in an uncontrolled zone as defined in the Code of Federal Regulations, Title 10, Part 20. In other words, in order to decontaminate all the Hanford Plutonium Reclamation Facility's liquid salt waste generated in one month derived from the metal precipitation step, would require a bed of sodium titanate powder measuring about 0.04 cubic meters. The amount of plutonium reclamation facility salt waste generated in a month at the Hanford Plutonium Reclamation Facility is about, as noted above, 120 cubic meters.

The sodium titanate sorbent with the adsorbed plutonium and americium-241 may subsequently be stored as a retrievable alpha waste, or may be compacted under heat (i.e., hot pressed at about 1100° C.), to a highly immobile, monolithic solid which can then be stored under various conditions. The effluent resulting from the sodium titanate contact step can either be routed to existing underground waste tanks or, alternatively, may be heated under pressure to evaporate the liquid to form a condensate which may be reused in the plant since it has less than 10$^{-3}$ nCi/l of alpha, while the solids may be heated in a dryer to achieve a dry solid which may subsequently be stored as chemical wastes or a very low level radioactive waste having less than 0.03 nCi/g alpha emitters.

The efficiency of freshly precipitated iron hydroxide in scavenging plutonium and other actinides from aqueous waste solutions is well known, having been used successfully at other sites for this scavenging purpose.

The plutonium reclamation facilities salt waste contains, typically, from 0.1 to 0.3 M aluminum nitrate. To eliminate a possibility of permanently precipitating gelatinous, hard to separate aluminum hydroxide, it is desirable in the precipitation step to adjust the plutonium reclamation facilities salt waste to 1 to 2 M hydroxide ion concentration. Even at these terminal hydroxide concentrations, which are much higher than those employed in the hydroxide precipitation steps in other sites, americium and plutonium are still effectively carried by the hydroxide precipitate. The inventor has found that metal hydroxide scavenging of americium-241 from plutonium reclamation facilities salt waste is extremely insensitive to change in precipitation temperature, agitation time, terminal hydroxide ion concentration (in the range 0.5 to 2 M) and whether sodium hydroxide is added to the waste or the waste is added to the sodium hydroxide.

A single precipitation of iron and other metal hydroxides from plutonium reclamation facilities salt waste solution yields a solution still containing more than the desired 10 nCi/g total alpha activity. Significant additional decontamination of this clarified alkaline solution liquor can be obtained by its passage through one or more beds of titanate sorbent.

Preparation and properties of the inorganic cation exchanger sodium titanate may be found in *Chemical Engineering News*, Volume 54, (No. 2), page 32, 1976.

The sodium titanate powder employed in these reactions was synthesized by the procedure described in the reference as shown by the following equation:

NaOH(methanol)+2Ti(OC$_3$H$_7$)$_4$+4H$_2$O→Na(-Ti$_2$O$_5$H)+8C$_3$H$_7$OH

Titanium isopropoxide and sodium hydroxide were reacted in a molar ratio of 2 to 1, respectively, with the titanium isopropoxide added to the sodium hydroxide-methanol solution with stirring. Hydrolysis is done by pouring the titanium isopropoxide-sodium hydroxide mixture into an acetone-water mixture containing 8.5% water by volume, one liter of the acetone-water mixture being required for each mole of titanium hydrolyzed. The hydrolyzed material is coarse and can be easily and rapidly vacuum filtered through a 50 micrometer frit. The titanate cake was then dried at ambient temperature under vacuum; the sorbent being considered to be "dry" when firing at 700° C. results in less than 30% weight loss.

The dried titanate powder may then be sized to separate that powder which passes a No. 40 U.S. Standard Sieve and is retained on a No. 140 U.S. Standard Sieve. While other sizes may also be employed, this range of 40–140 mesh is preferred. The bulk density of the 40–140 mesh titanate powder is 0.381 grams per milliliter.

A sodium titanate bed measuring 0.04 cubic meters (15 centimeter diameter) will adequately decontaminate the liquor derived from the metal precipitation step of about 120 cubic meters of salt waste from the plutonium reclamation facility. In this respect, this volume of sodium titanate will reduce the concentration of both americium-241 and plutonium in 1000 to as much as 4000 column volumes (CV) of the liquor to less than the maximum permissible concentration of each radioisotope in water in an uncontrolled zone. The decontaminated salt waste effluent from the titanate bed containing less than 10 nCi/g total alpha activity may be routed to suitable underground waste tanks or can be dried such as by a spray dryer or a wiped film evaporator and stored as a chemical waste. It may also be mixed with sufficient kaolin or bentonite clay to form the silicate mineral cancrinite and the resulting solid containing entrapped sodium nitrate may be thereafter stored as a chemical waste.

The sodium titanate powder contact step reduces the americium-241 concentration to less than 0.0002 to 0.0016 $\mu$Ci/l and the plutonium concentration to less than $10^{-3}$–0.004 $\mu$Ci/l. For reference, the maximum permissible concentrations for plutonium-239 and americium-241 in water in an uncontrolled zone are 0.005 and 0.004 $\mu$Ci/l respectively.

Table I lists the compositions of two batches of actual plutonium reclamation facilities salt waste as well as the composition of a synthetic salt waste used in integrated precipitation-titanate column tests. This composition for the synthetic salt waste was chosen as the average of the two batches of actual waste. The fluoride concentration of the synthetic salt waste was selected on the basis of published plutonium reclamation facility flowsheet data.

Appropriate amounts of purified americium-241 nitrate and plutonium nitrate were added to the synthetic waste prior to precipitation of metal hydroxides.

A flocculating agent obtained from the American Cyanamid Company and designated Cyanamid S4058 was used as a 0.5 weight percent solution in water in the metal precipitation step. The use of this or similar flocculating agents is known in the art and they have been successfully employed in the metal precipitation steps at other sites. The use of a flocculent is not considered to be a point of novelty of this invention.

TABLE I

COMPOSITION OF PLUTONIUM RECOVERY FACILITY SALT WASTE SOLUTIONS

| Component | Actual Waste Batch 1 | Actual Waste Batch 2 | Synthetic Salt Waste |
|---|---|---|---|
| $NO_3^-$, M | 1.92 | 2.32 | 2.09 |
| $Na^+$, M | 0.93 | 1.69 | 1.30 |
| $Al^{3+}$, M | 0.318 | 0.171 | 0.24 |
| $Mg^{2+}$, M | 0.00654 | 0.0311 | 0.019 |
| $NO_2^-$, M | (a) | 0.028 | (b) |
| $Ca^{2+}$, M | 0.00578 | 0.0192 | 0.012 |
| $Fe^{3+}$, M | 0.00532 | 0.00603 | 0.0057 |
| $Cr^{3+}$, M | (a) | 0.00028 | 0.0003 |
| $Ni^{2+}$, M | (a) | 0.00022 | 0.0002 |
| $SiO_3^{2-}$, M | 0.00311 | (a) | 0.0008 |
| $F^-$, M | (a) | (a) | 0.005 |
| $PO_4^{3-}$, M | (a) | <0.01 | (b) |
| $SO_4^{2-}$, M | (a) | <0.001 | 0.001 |
| Organic C, g/l | (a) | 0.219 | (b) |
| pH | 0.88 | 0.40 | 0.84 |
| $^{241}$Am, $\mu$Ci/l | 144 | 262 | (c) |
| Pu, $\mu$Ci/l | $\approx 16^{(d)}$ | $20^{(d)}$ | (c) |

(a)Not determined
(b)Not added
(c)See Table V
(d)As $^{239}$Pu

TABLE II

DESCRIPTION OF TITANATE SORPTION BEDS

| Run Number | Salt Waste Source | Diameter (cm) | Height (cm) | Volume (ml) | Titanate Form |
|---|---|---|---|---|---|
| 1 | Actual | 0.5 | 10.18 | 2.0 | Powder-40–140 mesh |
| 2 | Synthetic | 0.7 | 5.2 | 2.0 | Powder-40–140 mesh |

A statistically designed screening experiment was conducted to determine which of several variables significantly affected removal of americium-241 from salt waste solution by precipitation of iron and other metal hydroxides. Variables screened and their maximum and minimum values were precipitation temperature, 75° and 25° Celsius; digestion time, 4 and 0.5 hours; salt waste ferric ion concentration, 0.0053 and 0.025 M; terminal sodium hydroxide concentration, 0.93 and 1.42 M; reagant addition order, the addition of waste to the sodium hydroxide or the addition of sodium hydroxide to waste; the presence or absence of flocculent Cyanamid S4058. This screening experiment was conducted with actual salt waste (run 1) containing either "as received" 0.0053 M ferric ion or "as adjusted" 0.025 ferric ion. The following procedure was used in those experiments in which sodium hydroxide was added to the waste. Forty milliliters (ml) of the salt waste solution contained in a jacketed Erlenmeyer flask was adjusted to either 25° or 75° C. by circulation of heated water for an hour. Subsequently, the appropriate amount of 19.1 M sodium hydroxide was added with stirring; the resulting slurry was agitated vigorously at either 25° or 75° C. for either 0.5 or four hours and then allowed to stand 0.5 hours at 25° C. Where called for by the experimental design, 0.075 ml of a 0.5 weight percent solution of Cyanamid S4058 in water was added. In any case, the slurry was again agitated for one minute at 25° C., then transferred to a centrifuge for one hour and the clarified liquor was analyzed for its americium-241 content.

In the case where the waste was added to the sodium hydroxide, the required volume of 19.1 M sodium hydroxide was added to a jacketed flask and adjusted to either 25° or 75° C. by circulation of water from a controlled temperature bath. Subsequently, 40 ml of salt waste solution was added, with stirring, to the sodium hydroxide solution. Prior to its addition, the salt waste solution was heated to either 25° or 75° C. Following the addition of the waste to the sodium hydroxide solution, the process technique was identical to that described above.

In one run, 13.0 grams of washed and dried solids obtained from addition of sodium hydroxide to synthetic salt waste was intimately mixed with 18.3 grams of silicon dioxide, 5.0 grams of sodium borate, and 1.7 grams of lithium carbonate. This mixture, contained in a platinum crucible, was heated to 1200° C., held at 1200° C. for two hours and then allowed to cool overnight to about 25° C. A clear amber-colored glass was obtained.

A description of the titanate beds used to sorb americium-241 and plutonium from the alkaline supernatant solution resulting from the large scale precipitations is given in Table II. All resin beds were operated downflow at about 25° C. and at 4 to 5 column volumes per hour. Prior to use, all titanate beds were flushed with 1 M sodium hydroxide and/or water.

Salt waste solutions were analyzed by atomic absorption spectroscopy techniques for inert metallic components. Laser Raman spectroscopic procedures were utilized to analyze waste solutions for nitrate ion, nitrite ion, sulfate ion and phosphate ion. The hydroxide ion concentration of waste solutions after making them alkaline was measured by means of a potentiometer titration procedure designed to eliminate interference from aluminate ions. A total carbon analyzer instrument was employed to determine the organic carbon content of actual salt waste. Conventional gamma energy pulse height measurements using a germanium (lithium) detector were used to determine americium-241 concentrations in salt wastes before and after precipitation and titanate sorption treatment. Sample sizes ranged from 1 to 500 ml depending on americium-241 level. The plutonium content of salt waste solutions at various points of the decontamination process was determined by acidifying the waste sample to 4 M nitric acid, spiking with plutonium-236 to determine plutonium recovery, and subjected to a series of reduction-oxidation steps to destroy any polymeric plutonium and to convert all the plutonium to +4 oxidation state. Subsequently, the plutonium was extracted into a quarternary ammonium reagent solution and then stripped with sodium carbonate solution which was adjusted to 1 M nitric acid, and the plutonium extracted into a thenoyltrifluoroacetone solution, aliquots of which were then counted by standard alpha counting and energy analysis methods.

The design used in the screening statistical experiment is presented in Table III. In all cases the response variable was the americium decontamination factor. Analysis of the data showed that, over the narrow range of conditions chosen, none of these six variables noted above had a statistically significant effect at either the 90 or 95% confidence level on the removal of americium-241 by the metal hydroxide precipitate. Stated otherwise, under the experimental condition investigated, equally excellent removal of americium was realized irrespective of precipitation time and temperature, terminal sodium hydroxide molarity, order of combination of waste and sodium hydroxide, etc. Over a broader range of conditions of course, such variables as ferric ion concentration and terminal hydroxide ion concentration (pH) obviously strongly influence precipitation of americium.

According to the results in Table IV americium decontamination is virtually independent of terminal hydroxide molarity at least over the range 0.5 to 2.06 M sodium hydroxide. Below 0.5 M sodium hydroxide, americium removal appears to fall off slightly; also, below 0.5 M sodium hydroxide there is an increasing possibility of precipitating aluminum hydroxide. Corresponding to their different initial acidities, equal additions of 19.1 M sodium hydroxide to the different batches of actual and synthetic waste resulted in different terminal sodium hydroxide concentrations.

TABLE III

DATA FOR SCREENING EXPERIMENT

| Trial Number | Temperature (°C.) | Time[a] (Hours) | $Fe^{3+}$[b] (M) | Final $OH^-$ (M) | Order of Addition of Reagents | Flocculent Added[c] | Final $^{241}Am$, $\mu/Ci/l$ | $^{241}Am$ $DF$[d] |
|---|---|---|---|---|---|---|---|---|
| 1 | 75 | 4 | 0.0053 | 0.93 | Waste to $OH^-$ | Yes | 0.0902 | 1600 |
| 2 | 75 | 0.5 | 0.025 | 0.93 | Waste to $OH^-$ | No | 0.0742 | 1780 |
| 3 | 25 | 4 | 0.025 | 1.42 | $OH^-$ to Waste | No | 0.0462 | 2850 |
| 4 | 75 | 4 | 0.025 | 1.42 | $OH^-$ to Waste | No | 0.104 | 1270 |
| 5 | 75 | 4 | 0.0053 | 0.93 | $OH^-$ to Waste | Yes | 0.112 | 1290 |
| 6 | 75 | 0.5 | 0.0053 | 0.93 | Waste to $OH^-$ | No | 0.0307 | 4690 |
| 7 | 25 | 0.5 | 0.0053 | 0.93 | $OH^-$ to Waste | Yes | 0.137 | 1040 |
| 8 | 25 | 0.5 | 0.025 | 1.42 | Waste to $OH^-$ | Yes | 0.0879 | 1500 |
| 9 | 25 | 4 | 0.0053 | 1.42 | Waste to $OH^-$ | No | 0.0241 | 5980 |
| 10 | 75 | 0.5 | 0.025 | 1.42 | $OH^-$ to Waste | Yes | 0.0628 | 2100 |
| 11 | 25 | 4 | 0.025 | 0.93 | Waste to $OH^-$ | Yes | 0.0286 | 4630 |
| 12 | 25 | 0.5 | 0.0053 | 1.42 | $OH^-$ to Waste | No | 0.0769 | 1870 |

[a]Time stirred after waste and NaOH mixed.
[b]Iron concentration before precipitation.
[c]Cyanamid S4058.
[d]DF = Decontamination Factor

TABLE IV

VARIATION OF AMERICUM-241 REMOVAL WITH TERMINAL HYDROXIDE CONCENTRATION

| Salt Waste Type | Batch[a] | 19.1M NaOH (ml) | Terminal NaOH M | Precipitate Volume (ml) | Clarified Liquor $^{241}Am,\mu Ci/l$ |
|---|---|---|---|---|---|
| Actual | 2[b] | 4.0 | 0.105 | | 0.0927 |
| Actual | 2 | 5.0 | 0.482 | 6.0 | 0.0266 |
| Actual | 2 | 6.0 | 0.944 | 4.0 | 0.0208 |
| Actual | 2 | 7.0 | 1.48 | 4.0 | 0.0207 |
| Actual | 2 | 8.0 | 2.06 | 4.0 | 0.0233 |
| Actual | 1[c] | 6.0 | 1.42 | | 0.0325 |

Indicated amounts of 19.1M NaOH added with stirring to 30-ml portions of salt waste solution. The resulting slurry was agitated one hour at ~25° C. After addition of 0.075 ml Cyanamid S4058 flocculant, the precipitate was centrifuged for three hours.

[a]See Table I
[b]Initial pH = 0.40
[c]Initial pH = 0.88

TABLE V

| Type | Initial Salt Waste Solution Volume (l) | Initial Salt Waste Solution $^{241}$Am (μCi/l) | Initial Salt Waste Solution Pu$^{(a)}$ (μCi/l) | Scavenged Waste $^{241}$Am (μCi/l) | Scavenged Waste Pu$^{(a)}$ (μCi/l) | Decontamination Factors Am | Decontamination Factors Pu |
|---|---|---|---|---|---|---|---|
| Actual $^{(b)}$ | 2.1 | 144 | 16 | 0.0393 | 3.91 | 3,660 | 4.1 |
| Synthetic$^{(c)}$ | 8.0 | 20.7 | 84.5 | 0.0314 | 11.1 | 660 | 7.6 |
| Synthetic$^{(d)}$ | 8.0 | 273 | 90.0 | 0.0439 | 10.5 | 6,220 | 8.6 |

$^{(a)}$As $^{239}$Pu
$^{(b)}$Batch 1, see Table I.
$^{(c)}$Scavenged waste was also 1.37M OH$^-$, 0.19M Al, $6.8 \times 10^{-5}$M Fe, $<9.0 \times 10^{-5}$M Mg, and $<1.6 \times 10^{-4}$M Ca.
$^{(d)}$Scavenged waste was 1.46M OH$^-$.

As shown in Table V, precipitation of metal hydroxides from either actual or synthetic salt waste provided excellent decontamination from americium-241. Plutonium was scavenged from both the actual and synthetic wastes far less effectively than was americium. Even so, a single precipitation of metal hydroxides reduced the total actinide content of all the alkaline salt solutions to less than 50 nCi/g. As indicated in Table V, the synthetic waste solutions were spiked to a plutonium concentration of about five or six times that of actual salt waste.

The dried metal hydroxide solids resulting from the precipitation step can, of course, be simply stored in suitable drums or other containers as a retrievable actinide waste. Alternatively, the dried solids can be conveniently converted to an immobile borosilicate glass suitable for long term storage or disposal in surface or geologic repositories.

The very high affinity of the sodium titanate exchanger for greater than or equal to 2+ cations from strongly alkaline media is noted in data illustrating this property for americium (valence of +3) wherein this data is plotted in FIG. 2. The sodium titanate powder form strongly takes up americium with a valence of +3 from sodium nitrate - sodium hydroxide solutions.

Column tests were conducted to determine the capacity and potential of sodium titanate powder for removing actinides from alkaline actual (Table 6) and synthetic (Table 7) plutonium reclamation facility salt waste. As noted in Table 7, from 1000 column volumes of feed to 4000 column volumes of feed were passed through the titanate bed. All the decontaminated effluent contained less than 0.004 μCi/l of americium-241 and less than 0.005 μCi/l of plutonium. These concentrations are, respectively, the maximum permissible concentrations of americium-241 and plutonium-239 in water in an uncontrolled zone. In Table VII, the analyses for plutonium that measured <0.925 were limited by the sample size of two milliliters. With bigger samples (500 ml), it was analytically possible to show that the plutonium concentration was <0.0010 μCi/l. The americium-241 concentration in the bulk of the titanate treated effluent was only about 0.1 of the maximum permissible concentration value in water in an uncontrolled zone. These results conclusively demonstrate the ability of sodium titanate powder to effectively and smoothly decontaminate alkaline plutonium reclamation facility salt waste.

TABLE VI

Sodium Lithanate Powder Sorption of Actinides From Actual Salt Waste

| $^{241}$Am Sorption Cumulative CV | $^{241}$Am$^{(a)}$ (μCi/l) | Pu Sorption Cumulative CV | Pu (μCi/l) |
|---|---|---|---|
| 24 | <0.0024 | 505 | 0.0040 |
| 105 | 0.0021 | 778 | 0.0026 |
| 144 | <0.003 | 954 | 0.0040 |
| 223 | 0.0020 | | |
| 261$^{(b)}$ | <0.0033 | | |
| 337 | <0.0033 | | |
| 376 | <0.0035 | | |
| 462 | <0.0030 | | |
| 505$^{(b)}$ | <0.0038 | | |
| 548 | <0.0053 | | |
| 642 | <0.0045 | | |
| 681 | <0.0052 | | |
| 778$^{(b)}$ | <0.0045 | | |
| 817 | <0.0054 | | |
| 914 | <0.0057 | | |
| 954 | <0.0062 | | |

Run Conditions: Titanate bed - 2.0 ml (0.5-cm dia.), 40-140 mesh powder. Feed - Liquor from precipitation run with actual waste containing 0.0393 μCi/l $^{241}$Am and 3.91 μCi/l Pu. Flows - 4-5 CV/hr, downflow at 25° C.

$^{(a)}$From analysis of 25-ml samples.
$^{(b)}$From analysis of 500-ml samples, the following results were obtained:
1-261 CV, $^{241}$Am = 0.00032 μCi/l
262-505 CV, $^{241}$Am = 0.00040 μCi/l
506-778 CV, $^{241}$Am = 0.00127 μCi/l

TABLE VII

Sodium Titanate Powder Sorption of Actinides From Synthetic Salt Waste

| Cumulative CV | Effluent $^{241}$Am$^{(a)}$ (μCi/l) | Effluent Pu (μCi/l) |
|---|---|---|
| 405 | <0.0002 | <0.0010$^{(b)}$ |
| 739 | <0.00023 | <0.0010$^{(b)}$ |
| 1,049 | <0.00017 | <0.925$^{(c)}$ |
| 1,359 | <0.00017 | <0.925$^{(c)}$ |
| 1,609 | <0.00017 | <0.925$^{(c)}$ |
| 1,899 | <0.00022 | <0.925$^{(c)}$ |
| 2,217 | 0.00037 | <0.925$^{(c)}$ |
| 2,522 | 0.00042 | <0.925$^{(c)}$ |
| 2,832 | 0.00053 | <0.0010$^{(b)}$ |
| 3,242 | 0.00070 | <0.0010$^{(b)}$ |
| 3,562 | 0.00082 | <0.0010$^{(b)}$ |
| 3,892 | 0.00159 | |

Run Conditions: Titanate bed - 2.0 ml (0.7 cm dia.), 40-140 mesh powder. Feed - Liquor from precipitation runs with synthetic salt waste containing 0.314 μCi/l $^{241}$Am and 11.1 μCi/l Pu. Flows - 4-5 CV/hr, downflow at 25° C.

$^{(a)}$From analysis of 500-ml samples
$^{(b)}$From analysis of 50-ml samples
$^{(c)}$From analysis of 2-ml samples

What is claimed is:

1. In the decontamination of plutonium reclamation facility salt waste, wherein said salt waste is first contacted with sodium hydroxide to form a precipitate and a supernatant liquid containing greater than 10 nCi/g alpha radiation of americium-241 and plutonium, and wherein said precipitate is selected from the group consisting of calcium hydroxide, magnesium hydroxide and iron hydroxide, and wherein said precipitate further extracts from 80 to 90% of the plutonium and greater than 99.9% of the americium from the salt waste, the improvement consisting essentially of contacting the supernatant liquid from the metal precipitation step with sodium titanate powder to adsorb said plutonium and americium-241 upon said sodium titanate powder and remove said plutonium and americium-241 from said supernatant liquid of said metal precipitation step and yield a plutonium and americium free effluent containing less than $10^{-3}$ nCi per liter alpha emitters.

2. The process of claim 1 wherein said sodium titanate is a powder of a size range from 40 mesh to 140 mesh.

3. A process for decontaminating plutonium reclamation facility salt waste comprising contacting said salt waste with sodium hydroxide to effect precipitation of ferric hydroxide, magnesium hydroxide, and calcium hydroxide, and to scavenge from 80 to 90% of the plutonium in said salt waste and greater than 99.9% americium-241 from said salt waste, said metal precipitation step also yielding a supernatant liquid containing greater than about 0.03 microcuries per liter of americium-241 and greater than about 5 microcuries per liter of plutonium, thereafter contacting said supernatant liquid with a sodium titanate powder of from 40 to 140 mesh U.S. Standard Sieve Size Series, to adsorb the plutonium and the americium-241 upon said sodium titanate powder, the effluent from said sodium titanate sorption step containing less than about $10^{-3}$ to 0.004 microcuries per liter plutonium and less than about 0.0002 to 0.0016 microcuries per liter of americium-241.

* * * * *